(12) United States Patent
Hanington (10) Patent No.: US 8,085,561 B2
(45) Date of Patent: Dec. 27, 2011

(54) POWER SUPPLY WITH INTEGRATED CONCENTRIC HIGH VOLTAGE MULTIPLIER

(76) Inventor: Gary Hanington, Elko, NV (US)

( * ) Notice: Subject to any disclaimer, the term of this patent is extended or adjusted under 35 U.S.C. 154(b) by 373 days.

(21) Appl. No.: 12/490,041

(22) Filed: Jun. 23, 2009

(65) Prior Publication Data

US 2010/0226155 A1 Sep. 9, 2010

Related U.S. Application Data (63) Continuation-in-part of application No. 12/397,015, filed on Mar. 3, 2009.

(51) Int. Cl.
*H02M 3/18* (2006.01)
(52) U.S. Cl. ......................................................... 363/61
(58) Field of Classification Search .............. 363/59–61, 363/125, 126
See application file for complete search history.

(56) References Cited

U.S. PATENT DOCUMENTS

| | | | |
|---|---|---|---|
| 3,568,036 A | 3/1971 | Rosenberg | |
| 3,593,107 A | 7/1971 | Chilton | |
| 3,911,292 A | 10/1975 | Petrick et al. | |
| 4,041,366 A | 8/1977 | Bauer | |
| 4,201,953 A | 5/1980 | Robbins | |
| 4,320,446 A | 3/1982 | Langford et al. | |
| 4,789,997 A * | 12/1988 | Madsen et al. | 378/109 |
| 4,808,368 A | 2/1989 | Humphreys | |
| 4,916,576 A | 4/1990 | Herbert et al. | |
| 4,996,017 A | 2/1991 | Ethridge | |
| 5,191,517 A | 3/1993 | Stephenson | |
| 5,325,284 A | 6/1994 | Stephenson | |
| 5,331,255 A * | 7/1994 | Banbury et al. | 315/411 |
| 5,331,505 A | 7/1994 | Wilheim | |
| 5,335,161 A | 8/1994 | Pellegrino et al. | |
| 5,515,259 A | 5/1996 | Stephenson | |
| 5,523,939 A | 6/1996 | Stephenson | |
| 5,601,633 A | 2/1997 | Ponizovsky et al. | |
| 6,512,666 B1 | 1/2003 | Duva | |
| 6,545,854 B2 | 4/2003 | Trinh et al. | |
| 6,759,766 B2 | 7/2004 | Hiratsuka et al. | |
| 7,342,988 B2 | 3/2008 | Leung et al. | |
| 7,362,842 B2 | 4/2008 | Leung | |
| 7,405,409 B2 | 7/2008 | Kearfott | |

OTHER PUBLICATIONS

U.S. Appl. No. 12/397,015, filed Mar. 3, 2009, Gary Hanington.

* cited by examiner

*Primary Examiner* — Matthew Nguyen
(74) *Attorney, Agent, or Firm* — Thorpe North & Western LLP (57) ABSTRACT

A high voltage power supply for use in small diameter spaces such as in oil well logging devices includes an AC voltage source and a voltage multiplier circuit. An inside set of parallel capacitors is constructed with an inside common capacitor electrode, an inside dielectric material around the outside of the inside common capacitor electrode, and individual inside capacitor electrodes formed of conductive material positioned around the outside of the inside dielectric material. An outside set of parallel capacitors is constructed with a hollow outside common capacitor electrode with a central internal hollow space, an outside dielectric material around the inside of the outside common capacitor electrode, and individual outside capacitor electrodes formed of conductive material positioned around the inside of the outside dielectric material. The inside set of parallel capacitors fits concentrically inside the outside set of parallel capacitors. Rectifiers connect selected inside capacitors to selected outside capacitors to form a voltage multiplier circuit.

20 Claims, 4 Drawing Sheets

FIG. 6

POWER SUPPLY WITH INTEGRATED CONCENTRIC HIGH VOLTAGE MULTIPLIER

RELATED APPLICATIONS

This is a continuation-in-part of my copending application Ser. No. 12/397,015, filed Mar. 3, 2009, and entitled "Power Supply with Integrated Linear High Voltage Multiplier and Capacitors Therefor", hereby incorporated by reference.

BACKGROUND OF THE INVENTION

1. Field of the Invention

The present invention relates generally to power supplies for generating high voltages. More particularly, the present invention relates to a high voltage power supply such as used with neutron generating tubes in oil well logging equipment. Further, the invention relates to an arrangement of special capacitors utilized in these high voltage power supplies.

2. Related Art

Oil well logging devices which include neutron generating tubes are well known in the art. Such devices are sized to be lowered down an oil well bore and emit neutrons into the formation through which the bore passes. By detecting the radiation coming back from the formation, particularly the atoms in the formation that have been made radioactive by the emitted neutrons, the location of the oil bearing strata can be determined along the depth of the well. This indicates where the well casing should be perforated to allow oil to flow into the well.

The neutron generating tubes which are the heart of these logging devices require 100,000 volts or more to operate. Currently available logging devices generally use a Cockroft-Walton type voltage multiplier circuit which include capacitors and rectifiers, which takes an AC voltage from a step up transformer and converts it to a high DC voltage by successively raising up the voltage in a step wise fashion to operate the neutron generating tube. Voltage multiplying circuits using capacitors and rectifiers are well known, with the Cockroft-Walton series multiplier type circuit being commonly used in the currently available logging devices. These currently available logging devices can generally operate satisfactorily up to about 150 degrees C. Beyond this point, excessive electrical leakage in the semiconductors (rectifiers) preclude efficient power conversion. The leakage currents in semiconductors generally increase exponentially with increases in temperature. Many of the deep oil wells currently being drilled have internal temperatures in the deeper parts of the well over 150 degrees C. and up to 175 degrees C. or greater. This presents a problem in logging the deeper portions of the wells because, as indicated, the presently used logging devices do not operate satisfactorily at these higher temperatures.

In addition, in order to provide the required 100 kV of operating voltage required by neutron generating tubes, a reasonable limit must be imposed on the number of stages present in a Cockroft-Walton series voltage multiplying circuit. Several reasons exist for this limit. One deals with the output voltage droop that occurs between no load and full load conditions which is proportional to the cube of the number of stages utilized. When the neutron tube is gated to be on, it is not uncommon to find the 100 kV dropping towards 80 kV as the power supply tries to feed into the load of the tube. This droop in output voltage has a negative effect on the flux of neutrons being produced and interferes with the analysis that is being performed. A second problem that occurs is the generation of ripple voltage that rides on the high voltage output due to the incomplete conversion of AC to DC voltage. This unwanted electrical noise interferes with the acceleration voltage of the tube and is difficult to remove from the process. Unfortunately, the ripple voltage present on the high voltage output is proportional to the square of the number of stages used in the multiplier.

There is currently a need for an oil well logging device that will operate at temperatures above 150 degrees C.

SUMMARY OF THE INVENTION

It has been found that while semiconductor rectifiers operating at high reverse voltages, i.e., the rectifiers are used to block high voltages, break down or suffer excessive leakage currents at temperatures above 150 degrees C., that such rectifiers, if operated at lower voltages, will operate satisfactorily up to and over 175 degrees C., the temperatures needed for operation in deep oil wells. Thus, if the reverse voltages across the rectifiers can be reduced, the operating temperature for the circuits using such rectifiers can be increased. By increasing the number of stages used in a voltage multiplying circuit, the reverse voltage across the rectifiers in each stage is reduced. However, as indicated above, the number of stages that can be included in the presently used Cockroft-Walton series multiplication circuits to provide the needed high output voltage without excessive output voltage droop and ripple is very limited. Therefore, it is generally not possible to increase the number of stages in such Cockroft-Walton multiplier circuits above eight stages. It has been found that in voltage multiplier circuits utilizing a parallel multiplication scheme, the voltage regulation (droop) and ripple does not scale as the cube and square of the number of stages used as it does in the Cockroft-Walton series multiplier circuits. In the parallel multiplier circuit topology, the output voltage regulation (droop) scales only as the number of stages (N) while the ripple voltage is only a function of the capacitance used, independent of the number of stages. Therefore, a much larger number of multiplying stages can be used to generate the needed high DC voltage output without serious output voltage droop and ripple. If such voltage multiplying circuits can be incorporated into oil well logging devices, such circuits can be used to provide the needed DC voltage to operate the neutron generating tube at the higher temperatures above 150 degrees C. However, when using a parallel voltage multiplier circuit, it is necessary to provide capacitors that will operate at high voltages up to the output voltage of the power supply, usually at least 100 kV. Providing high voltage capacitors that will physically fit into such circuits where the circuits have to fit into a cylindrical case with an outside diameter between two inches and one and three eights inches (35 mm diameters are common), is very difficult. Standard 100 kV disc or mica construction high voltage capacitors of large value do not fit in such small diameter spaces.

According to the invention, a high voltage power supply which will operate at high temperatures in excess of 150 degrees C. and which can fit into an oil well logging tool can be made by utilizing a voltage multiplier circuit with a parallel multiplication scheme, so a much larger number of multiplying stages, for example, ten or twenty stages, can be used in the circuits thereby reducing the reverse voltage drop across each semiconductor rectifier. The lower reverse voltage drop across the rectifiers reduces the leakage currents thereby reducing the power loss, minimizing internal power dissipation, and increasing system efficiency. This allows such circuits to operate at higher temperatures. Since the voltage regulation and ripple in such parallel multiplier circuits does not scale as the cube and square, respectively, of the number of stages used, better voltage regulation with less ripple is obtained. Because high voltage capacitors are required for such circuits, the invention uses a special novel construction of high voltage capacitors that will fit into the small diameters required by the oil well logging devices. Examples of circuits usable with the invention and a capacitor construction for sets of capacitors electrically connected in parallel usable with such circuits to provide a physical circuit construction to fit into oil well logging devices are shown in my referenced copending application Ser. No. 12/397,015, filed Mar. 3, 2009, incorporated herein by reference. As described in that referenced patent application, a set of parallel capacitors can be constructed around a common capacitor electrode, such as formed by an elongate piece of conductive material, for example a length of cylindrical conductive material such as a length of metal tubing or rod, coated with a high voltage dielectric, such as several layers of a Kapton or other plastic film material wrapped around at least a portion of the cylindrical length or a ceramic material positioned around at least a portion of the cylindrical length such as a sleeve of alumina positioned around the tube or rod, and with separate individual capacitor electrodes formed on the dielectric with conductive material, such as with strips of conductive material wrapped concentrically with the tube or rod outside the dielectric material. With this construction, a small diameter set of high voltage parallel capacitors can be constructed to fit within an oil well logging device. For the parallel circuitry, two sets of parallel capacitors are formed in the manner indicated above and the two sets are arranged physically in side-by-side configuration with a rectifier matrix connecting the individual capacitors of each set of capacitors.

The present invention provides the same parallel circuitry as shown in my copending application with two sets of parallel capacitors. However, where my copending application shows the two sets of parallel capacitors physically arranged in side-by-side configuration, the present invention teaches a concentric physical construction with one set of capacitors positioned concentrically inside of the other set of capacitors. The inside set of parallel capacitors is formed, as in my copending application, around a common capacitor electrode, such as formed by an elongate piece of conductive material, for example a length of conductive tubing or rod, coated with a high voltage dielectric, such as several layers of a Kapton or other plastic film material wrapped around at least a portion of the length of the conductive material or a ceramic material positioned around at least a portion of the length of the conductive material such as a sleeve of alumina positioned around the tube or rod, and with separate individual capacitor electrodes formed on the dielectric with conductive material, such as with strips of conductive material wrapped concentrically with the tube or rod outside the dielectric material. The outside set of parallel capacitors is similarly formed around a common capacitor electrode, but with the common electrode being hollow and with the dielectric and the individual capacitor electrodes formed around the inside of the common electrode rather than around the outside of the common electrode. The inside set of capacitors is positioned inside the outside set of capacitors with space therebetween for a rectifier matrix connecting the individual capacitors of the inside and outside sets of capacitors. Thus, the outside set of capacitors is formed in an elongate piece of conductive hollow material, such as a length of metal hollow tubing, coated on the inside with a high voltage dielectric, such as several layers of a Kapton or other solid plastic or plastic film material wrapped around at least a portion of the inside of the hollow tube or a ceramic or other dielectric material positioned around the inside of at least a portion of the hollow tube, and with separate individual capacitor electrodes formed on the inside of the dielectric material. The separate electrodes of conductive material may be strips of conductive material wrapped concentrically within and against the inside surface of the dielectric material within the tube or by areas of metallization on the inside surface of the dielectric material in the tube. The inner set of capacitors is positioned within the hollow outer set of capacitors with a space therebetween sufficient to allow connection of the respective capacitors with a plurality of rectifiers. To insure mechanical integrity and/or electrical isolation between capacitors of the two sets of capacitors and between the rectifiers, the space between the two sets of capacitors can be filled with a high voltage high temperature insulating potting material or $SF_6$ gas.

In the parallel voltage multiplier circuitry, one of the sets of capacitors has a common connection to ground. The individual capacitors of this set of capacitors all have DC voltages across them when the voltage multiplier circuit is in operation, and the common electrode formed by the conductive tube forms the common ground connection for all of these capacitors. In the physical implementation of this circuitry of the invention, this set of capacitors can be the outside set of capacitors with the common electrode of this outside set of capacitors forming a cylindrical metallic outside housing for the power supply with such housing held at ground potential. This grounded outside housing may also form a metallic housing for the logging device containing the high voltage supply along with the neutron generating tube.

The capacitance value of the individual capacitors can be varied by varying the surface area of the individual capacitor electrodes. The larger the surface area of individual capacitor electrodes, all else being equal, the larger the capacitance value. To supply the relatively large current bursts required of gated neutron tubes in oil well logging equipment, the final DC high voltage capacitor may be increased in value by extending the electrode to cover more surface area of the internal concentric dielectric.

BRIEF DESCRIPTION OF THE DRAWINGS

Additional features and advantages of the invention will be apparent from the detailed description which follows, taken in conjunction with the accompanying drawings, which together illustrate, by way of example, features of the invention, and wherein.

Reference will now be made to the exemplary embodiments illustrated, and specific language will be used herein to describe the same. It will nevertheless be understood that no limitation of the scope of the invention is thereby intended.

DETAILED DESCRIPTION OF THE ILLUSTRATED EMBODIMENTS

The invention is a high voltage power supply which can be used in any situation where a high voltage power supply is needed. A specific application of the high voltage power supply of the invention is in connection with oil well logging devices which are lowered down an oil well while emitting pulses of neutrons into the formation through which the well extends to find the oil bearing strata intersected by the well. The specific example embodiments described herein are directed to this specific application, but the invention is not so limited.

Figure 1:
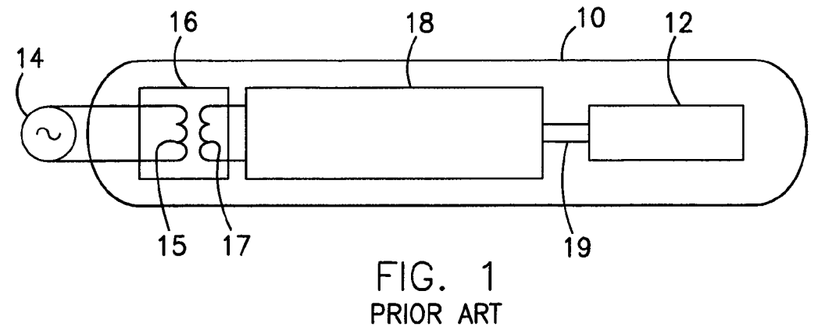
FIG. 1 is a general diagrammatic block diagram of an oil well logging device as currently used to log oil wells, and with which the high voltage power supply of the present invention may be used.
Figure 2:
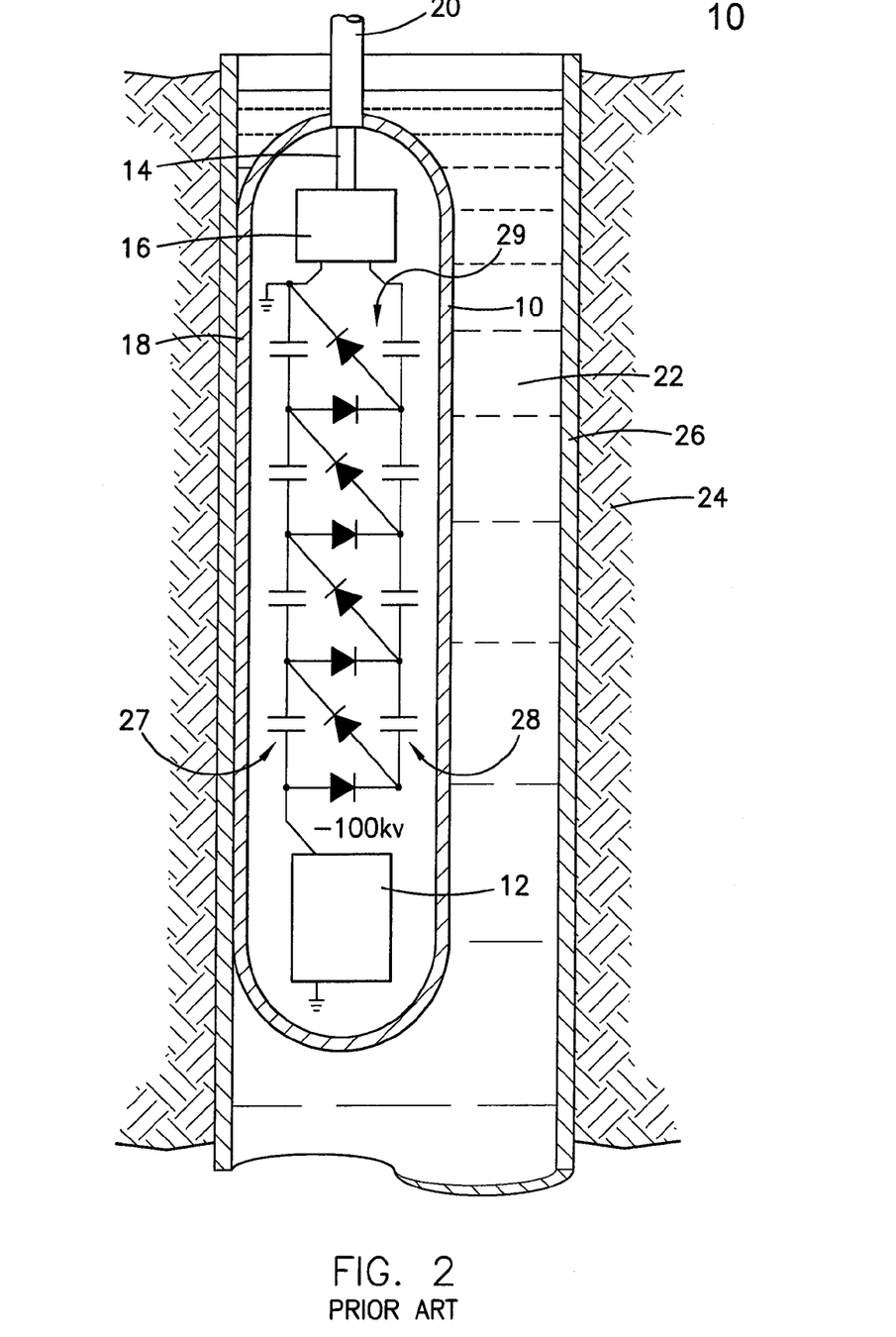
FIG. 2 is a vertical section through an oil well logging device as currently used again showing a general diagrammatic view of the logging device of FIG. 1 and showing a four stage Cockroft-Walton high voltage multiplier circuit.

Referring to FIGS. 1 and 2, an oil well logging device will generally include a metal case or housing 10 which houses a neutron source 12 in the form of a commercially available neutron generating tube. Such a tube requires a voltage of around 100,000 volts (100 kV) to accelerate charged particles from a particle source to impact a target material which releases neutrons when hit with the accelerated particles. Such neutron sources are well known in the art and are commonly used in oil well logging devices and are also used in homeland security inspection equipment. The required high voltage for the neutron source is supplied by a high voltage DC power supply which usually includes an AC power source connected to a voltage multiplier circuit. In the illustrated embodiment of FIGS. 1 and 2, which represents a generalized prior art oil well logging device, the AC voltage source is made up of an AC power supply 14 connected to a step up transformer 16. As shown, the AC power supply is connected to the primary winding 15 of the step up transformer 16, and the secondary winding 17 of the step up transformer, which provides the AC output voltage signal of the AC power source, is connected to the input of the voltage multiplier circuit 18. The voltage multiplier circuit 18 takes the AC output voltage signal from the AC power source, i.e., from secondary winding 17 of the step up transformer 16, and converts it to the high voltage DC output 19 by successively raising the voltage in a step wise fashion. The usual voltage multiplier circuit 18 used in such currently available oil well logging devices is a Cockroft-Walton series multiplier circuit as shown in FIG. 2. The high voltage DC output 19 of the voltage multiplier circuit 18 is connected in usual manner to the neutron source 12.

As indicated, the traditional logging devices as shown in FIG. 2 generally include a cylindrical housing 10 which is suspended in an oil well 22 by a cable 20 which can be extended from the top of the well to lower the logging device down the well or can be pulled up to raise the logging device in the well. The well extends through a ground formation 24 and may be cased with casing pipe 26. Because the casing of the well is generally about two inches in inside diameter, the logging device housing has an outside diameter of less than two inches so that it can fit into and move up and down the well. This means that the inside diameter of the housing 10 for the device is usually less than about one and three quarters inches. Everything in the housing as described has to fit within this small diameter.

As shown in FIG. 2, the AC power supply 14 may be a wire extending down the cable 20 suspending the logging device from the top of the well. An AC signal from the top of the well is then sent down the wire to the logging device. Alternately, the AC power source can be located in the logging device itself, and, for example, include a battery and an inverter to generate the AC input signal to the primary winding 15 of the step up transformer 16. A new drilling technique referred to as MWD (measure while drilling) uses well drilling equipment which incorporates a well logging device with neutron generating tube in the drilling equipment. This means that the well is logged as it is drilled and there is no separate logging device as shown in FIG. 2 that is lowered by a cable into the well after the well is drilled. With this new drilling equipment, the various components described are incorporated into the drilling equipment and operate in the same manner as described for the separate logging device to perform the logging as the well is being drilled. With this new equipment, the AC power supply 14 may be a local generator which generates AC power as the drill rotates in the well.

FIG. 2 includes a circuit diagram for the traditional prior art Cockroft-Walton series voltage multiplier circuit as the voltage multiplier circuit of block 18. As shown in FIG. 2, a four stage traditional Cockroft-Walton series multiplier circuit includes a set or bank of capacitors 27 connected in series with the grounded output of the step up transformer 16 and a set or bank of capacitors 28 connected in series with the ungrounded output of the step up transformer 16. The individual capacitors of the two banks 27 and 28 of capacitors are connected by a rectifier matrix made up of rectifiers 29. Each bank of capacitors are shown with four individual capacitors connected in series with a corresponding capacitor of each series connected by two opposing polarity rectifiers to form one of the four multiplication stages. Thus, the traditional Cockroft-Walton series multiplier circuit includes two sets or banks of capacitors, each of which have the capacitors of the bank connected in series.

In the embodiments shown, the invention is directed to the voltage multiplier circuit portion 18 of the high voltage power supply. The other parts of the high voltage supply and the oil well logging device in which the high voltage supply and the voltage multiplier circuit of the invention is shown, as an example of its use, generally remain the same as for the prior art shown in FIGS. 1 and 2.

Figure 3:
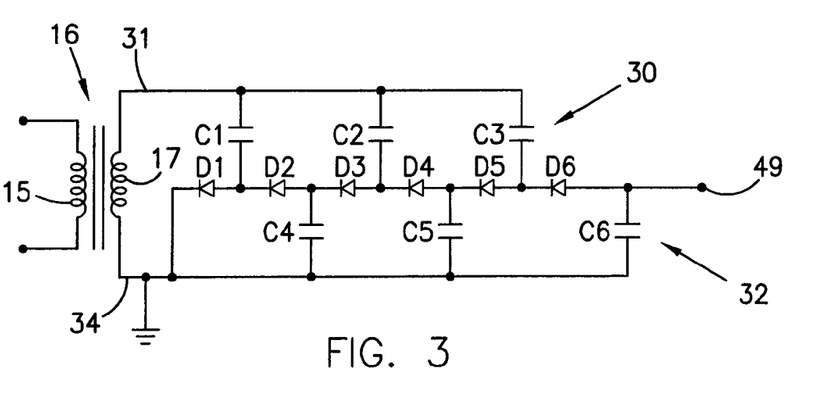
FIG. 3 is a circuit diagram of a parallel embodiment of a voltage multiplier circuit of the invention.

FIG. 3 shows a circuit diagram of a parallel embodiment of a voltage multiplier circuit of the invention. This, rather than being a traditional Cockroft-Walton series multiplier circuit with two banks of capacitors each connected in series, is a parallel multiplier circuit having two banks of capacitors each connected in parallel. A first bank of capacitors 30 made up of capacitors C1, C2, and C3 are connected in parallel to the output 31 of the secondary winding 17 of the step up transformer 16. A second bank of capacitors 32 made up of capacitors C4, C5, and C6 are connected in parallel with the grounded terminal 34 of the secondary winding 17 of the step up transformer. The first bank of capacitors 30 couple the AC signal from the secondary winding 17 of the step up transformer to the DC bank of capacitors, 32. This second or DC bank of capacitors 32 will all have DC voltages across them during operation of the circuitry. The capacitor C6 of the bank of capacitors 32 is connected between the multiplier circuit output and ground so will have the full DC output voltage of about 100,000 volts across it. The individual capacitors of the two banks 30 and 32 of capacitors are connected by a rectifier matrix made up of rectifiers D1-D6. The rectifiers will generally be semiconductor rectifiers such as diodes. For ease of illustration, the circuit of FIG. 3 shows only a three stage multiplier circuit with capacitors C1 and C4 and rectifiers D1 and D2 making up the first stage, capacitors C2 and C5 and rectifiers D3 and D4 making up the second stage, and capacitors C3 and C6 and rectifiers D5 and D6 making up the third stage. As many stages as desired may be used, the more stages being used, the less the voltage required to be blocked by any one of the rectifiers (the rectifier reverse voltage) for the same total circuit output voltage. In the parallel multiplier circuit topology, the output voltage droop (load regulation) is proportional only to the number of stages while the ripple voltage is only a function of the capacitance used, independent of the number of stages. This is different from the common Cockroft-Walton series multiplier circuits where the voltage droop that occurs between no load and full load conditions is proportional to the cube of the number of stages utilized and the ripple voltage present on the high voltage output is proportional to the square of the number of stages used in the multiplier. Therefore, it is desirable to limit the number of stages used in the prior art Cockroft-Walton series multiplier circuits as much as possible. For oil well logging equipment, it is common to use up to eight stages in a Cockroft-Walton multiplier circuit to provide the needed 100,000 volt output. The input voltage to such circuits provided by the step up transformers are normally in the range of 15,000 volts. This produces large reverse voltage drops across the rectifiers used in the Cockroft-Walton multiplier circuits which limit the performance of such circuits at high temperatures due to increased rectifier electrical leakage currents. For example, when the input to the Cockroft-Walton series multiplier circuit is 15,000 volts, the voltage required to be blocked by each of the rectifiers (the reverse voltage on the rectifiers) is about 15,000 volts.

As indicated, because in the parallel multiplier circuit topology the output voltage droop (load regulation) is proportional only to the number of stages (as opposed to the cube of the number of stages) while the ripple voltage is only a function of the capacitance used, independent of the number of stages (as opposed to the square of the number of stages), when using parallel multiplier circuits as opposed to the normally used Cockroft-Walton series multiplier circuits, the number of stages can be increased significantly compared to the number of stages used in the Cockroft-Walton series multiplier circuits. Therefore, to lessen the reverse voltage across the rectifiers to thereby increase the temperatures at which such circuits will operate satisfactorily, the number of stages used in the parallel circuits, such as the parallel circuit of FIG. 3, can be increased from the maximum of about eight stages used in the series circuit to ten, twenty, or more in the parallel circuits and, with the number of stages increased, the input voltage from the step up transformer to the multiplier circuit can be reduced. This also reduces the multiplication of the voltage at each stage of the multiplication circuit. For example, an input voltage of around 5,000 volts can be used for a twenty stage multiplier circuit (with 5,000 volt multiplication for each stage) rather than the 12,500 volts for an eight stage Cockroft-Walton circuit (with 12,500 volt multiplication for each stage). This reduces the reverse voltage across the rectifiers of about 12,500 volts for the Cockroft-Walton series voltage multiplier circuit to about 5,000 volts for a twenty stage parallel circuit. However, parallel multiplier circuits require at least some capacitors operable at voltages equal to and near the output voltage of the voltage multiplier. Thus, while the voltages across the rectifiers can be reduced with the use of more stages as allowed by the use of a parallel circuit, the voltage across the capacitors is increased in such parallel circuits. This presents the problem of providing high voltage capacitors that will fit into the small diameter spaces available in oil well logging equipment.

Figure 4:
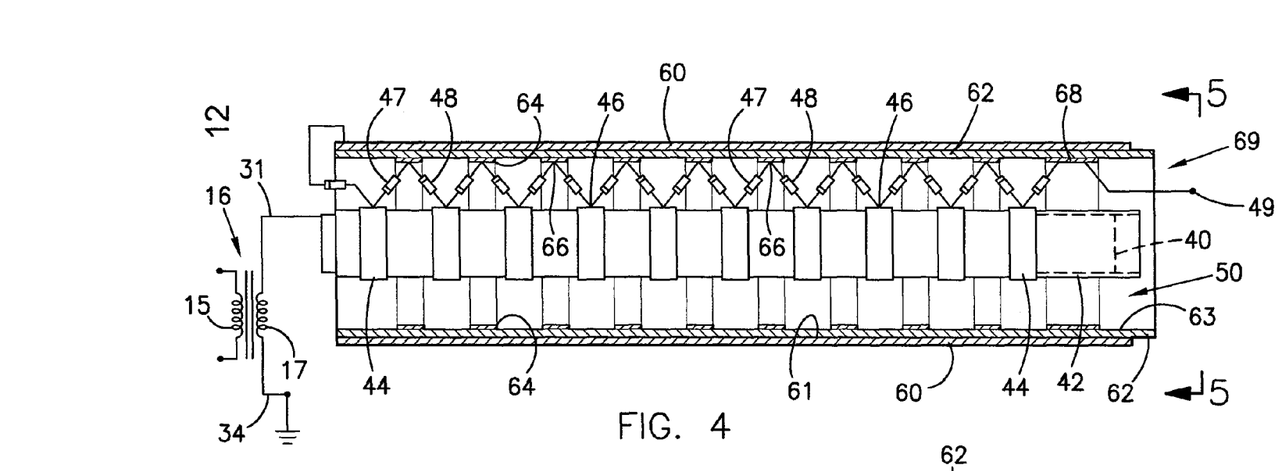
FIG. 4 is a generally schematic view of the physical arrangement of a parallel embodiment of a voltage multiplier circuit of the invention implementing the circuitry shown by the circuit diagram of FIG. 3 to form a ten stage negative output parallel multiplier circuit.

The use of the parallel multiplier circuits of the present invention in oil well logging equipment is possible with the use of a special high voltage capacitor construction of the invention. FIG. 4 shows a physical implementation according to the present invention of the circuit of FIG. 3 using, for illustration purposes, ten multiplier stages (FIG. 3 shows only three stages, and twenty stages are common for use with the parallel circuitry of the invention). As can be seen from FIG. 3, the parallel bank 30 of capacitors C1 through C3 which are connected in parallel all have a common connection of one side of each capacitor to the secondary winding output 31 from the secondary winding 17 of the step up transformer. This common connection makes it possible to construct a first bank of capacitors all sharing a common capacitor electrode or plate. Similarly, the parallel bank 32 of capacitors C4 through C6 which are connected in parallel all have a common connection of one side of each capacitor to the secondary winding output 34 from the secondary winding 17 of the step up transformer. This common connection makes it possible to construct a second bank of capacitors all sharing another common capacitor electrode or plate. In the illustrated embodiment, the first bank of capacitors 30 may be formed as an inside bank of parallel capacitors with the common capacitor electrode or plate for the inner bank of parallel capacitors 30 taking the form of a separate piece of elongate conductive material, such as a piece of elongate tube or rod of conductive material, shown as a conductive tube 40, such as a length of brass tube. The second bank of capacitors 32 may be formed as an outside bank of parallel capacitors with the common capacitor electrode or plate for the outside bank of parallel capacitors 32 taking the form of a separate piece of elongate conductive hollow material, such as a piece of elongate hollow tube material, shown as a hollow conductive tube 60, such as a length of hollow brass tube. The inside diameter of tube 60 is larger than the outside diameter of tube 40 so that the inside bank of parallel capacitors formed on tube 40 can fit inside of the outside bank of parallel capacitors formed in tube 60, with a space 50 between the inside and outside banks of parallel capacitors. In the arrangement shown, the outside bank of capacitors has the outside common capacitor electrode 60 connected to the grounded output 34 of the step up transformer secondary 17 to form the DC capacitor bank. The inside bank of capacitors has the inside common capacitor electrode 40 connected to transformer secondary output 31 to form the AC capacitor bank. However, this arrangement is not necessary and the step up transformer connections can be reversed depending up the application of the multiplier circuit.

In the embodiment shown, common capacitor electrode 40 of the inside parallel capacitor bank is coated with a dielectric material 42 having a high breakdown voltage. It has been found that a wrapping of multiple layers of a polyimide film material such as KAPTON tape or film material around the outside of the common electrode, e.g., around the brass tube 40, provides a dielectric of sufficient breakdown voltage to be used satisfactorily in a 100,000 volt power supply. A single layer of the KAPTON film or tape, depending on the thickness, will withstand up to about 30,000 volts. A wrapping of four layers of such KAPTON film or tape will withstand well over 100,000 volts. While the KAPTON film or tape has been found satisfactory for use in building the capacitors, various other electrically insulating materials can be used, such as Teflon or other plastics such as Torlon, Ultem, or Vespal, ceramics, aluminum oxide, reconstructed mica, boron nitride, etc. Rather than wrapping the dielectric material around the common capacitor electrode, the dielectric material can be coated, deposited, or otherwise positioned around the common capacitor electrode. With the dielectric layer 42 around the outside of the common capacitor electrode 40, the individual capacitors for a set or bank of parallel capacitors can be easily constructed by forming individual electrodes of conductive material 44 on the dielectric material 42, such as by wrapping a conductive material, such as a conductive foil material or a conductive band, around the outside of the dielectric material 42. The individual capacitor electrodes can also be formed by metalizing or otherwise depositing conductive material on the dielectric material 42.

Each separate electrode formed by conductive material 44 may be provided with a terminal connection 46 where the rectifiers 47 and 48 are connected in opposite orientations to the individual capacitor electrodes. Alternatively, the respective rectifiers can be attached, such as by soldering, directly to the conductive material forming the individual electrodes without provision of specific terminal configurations. Care must be taken that the dielectric coating 42 extends far enough beyond the conductive material 44 forming the first and last individual capacitor electrodes that there will be no arcing around the ends of the dielectric material 42 between the first and last individual capacitor electrodes and the tube forming the common electrode. As shown at the output end of the inside parallel capacitor bank, the dielectric material 42 can extend beyond the end of the tube 40 forming the common electrode 40. Also, although the difference in voltage between adjacent capacitors is not high since the number of stages is large, the individual capacitor electrodes 44 must be kept far enough apart along the tube to prevent arcing between the individual capacitors electrodes 44. While shown as a cylindrical tube, the common capacitive electrode 40 could take various other shapes and forms.

Rather than wrapping or depositing dielectric material around the outside of the common capacitor electrode, the dielectric material can be positioned around the common electrode by forming a dielectric material, such as a ceramic material such as boron nitride, into a separate dielectric sleeve to telescopically receive the conductive material forming the common electrode therein as described in my referenced application. The individual capacitor electrodes can be formed on the ceramic sleeve by coating or metallization around the sleeve, such as by a process which metalizes the individual electrodes directly on the ceramic sleeve, prior to insertion of the common electrode, or can be formed as previously indicated by conductive material being positioned around or wrapped around the sleeve either prior to or after insertion of the common electrode. Further, where the dielectric sleeve is rigid, the dielectric sleeve can form the structure of the inside capacitor bank and the common electrode inside the dielectric sleeve can be formed directly on the inside of the dielectric sleeve by coating or metalizing conductive material on the inside of the dielectric sleeve. For purposes of the patent, a common electrode formed directly on the inside of a dielectric sleeve is still considered to be a conductive tube forming the common electrode.

Common capacitor electrode 60 of the outside parallel capacitor bank is hollow and takes a form such as a hollow tube and has an inside surface 61 which is coated with a dielectric material 62 having a high breakdown voltage. Again, it has been found that multiple layers of a polyimide film material such as KAPTON tape or film material around the inside surface 61 of common electrode 60, e.g., around the inside of a brass tube, provides a dielectric of sufficient breakdown voltage to be used satisfactorily in a 100,000 volt power supply. While the KAPTON film or tape has been found satisfactory for use in building the capacitors, various other electrically insulating materials can be used, such as Teflon or other plastics such as Torlon, Ultem, or Vespal, ceramics, aluminum oxide, reconstructed mica, boron nitride, etc. Rather than placing a sheet of the dielectric material around the inside surface 61 of common capacitor electrode 60, the dielectric material can be coated, deposited, or otherwise positioned around the inside surface of the common capacitor electrode. Dielectric layer 62 has an inside surface 63. With the dielectric layer 62 around the inside surface of common capacitor electrode 60, the individual capacitors for a set or bank of parallel capacitors can be easily constructed by forming individual electrodes of conductive material 64 on the inside surface 63 of the dielectric material 62, such as by positioning a conductive material, such as a conductive foil material or a conductive band, around the inside surface 63 of dielectric 62. The individual capacitor electrodes can also be formed by metalizing or otherwise depositing conductive material on the inside surface of the dielectric material 62.

Each separate electrode formed by conductive material 64 may be provided with a terminal connection 66 where the rectifiers 47 and 48 are connected. Alternatively, the respective rectifiers can be attached, such as by soldering, directly to the conductive material forming the individual electrodes without provision of specific terminal configurations. Again, care must be taken, particularly with the last capacitor toward the output end 69 of the tube 60, here shown as individual capacitor electrode 68, that the dielectric coating 62 extends far enough beyond the conductive material forming the last individual capacitor electrode 68 that there will be no arcing between the last individual capacitor electrode and the tube forming the common electrode. It should be remembered that the last capacitor electrode 68 will have the full output voltage of about 100,000 volts thereon. As shown, the dielectric material 62 can extend beyond the end of the tube 60 at the high voltage output end 69 of the outside parallel capacitor bank. Also, again, although the difference in voltage between adjacent capacitors is not high since the number of stages is large, the individual capacitor electrodes 64 must be kept far enough apart along the inside of the tube to prevent arcing between the individual capacitor electrodes 64. While shown as a cylindrical hollow tube, the common capacitive electrode 60 could take various other shapes and forms that can substantially surround the inside parallel capacitor bank in a substantially concentric manner.

Rather than wrapping or depositing dielectric material around the inside of the common capacitor, the dielectric material can be positioned around the inside surface of the common electrode by forming a dielectric material, such as a ceramic material such as boron nitride, or high temperature polymers such as Ultem, Torlon, or Vespal, into a separate dielectric sleeve or insert to telescopically fit into a hollow conductive tube forming the outside common capacitor electrode. The individual capacitor electrodes can be formed on the inside surface of the ceramic sleeve or insert by coating or metallization around the inside surface of the dielectric sleeve, such as by a process which metalizes the individual electrodes directly onto the inside surface of the ceramic sleeve, prior to insertion of the sleeve into the common electrode, or can be formed as previously indicated by conductive material being positioned around or wrapped around the inside surface of the dielectric sleeve either prior to or after insertion of the dielectric sleeve into the common electrode. Further, where the dielectric sleeve is rigid, the dielectric sleeve can form the structure of the outside capacitor bank and the common electrode outside the dielectric sleeve can be formed directly on the outside of the dielectric sleeve by coating or metalizing conductive material on the outside of the dielectric sleeve. For purposes of the patent, a common electrode formed directly on the outside of a dielectric sleeve is still considered to be a conductive tube forming the common electrode.

For a ten stage multiplier as shown in FIG. 4, which uses two banks of capacitors, each bank having ten capacitors connected in parallel, the tube forming the inside common electrode 40 can be about seven millimeters in diameter and about three hundred millimeters in length. The tube forming the outside common electrode 60 can be about thirty five millimeters in diameter, with an inside diameter of about thirty three millimeters. With the individual capacitor electrodes 44 of the inside bank of capacitors positioned around the outside of the inside common electrode 40 and the individual capacitor electrodes 64 of the outside bank of capacitors positioned inside the outside common electrode 60, a space 50 is provided between the inner and outer banks of capacitors. The rectifiers 47 and 48 have tubular cases about four millimeters in diameter and about twenty five millimeters long, and fit within the space 50 between the banks of capacitors. The rectifiers 47 and 48 are connected in opposite orientations between respective capacitors of the respective banks of parallel capacitors to form the circuit as shown in the circuit diagram of FIG. 3. The rectifiers will be arranged along the capacitor banks so as to fit into the space 50 between the capacitor banks. The rectifiers connected between the inside and outside capacitor banks can physically position and hold the inside capacitor bank in substantially fixed position with respect to the outside capacitor bank. The outside diameter of the common electrode of the outside bank of capacitors determines the physical size of the multiplier circuit and allows the multiplier circuit to be placed in oil well logging devices. A dielectric potting material can be placed in the space 50 between the respective capacitor banks to provide increased mechanical stability and electrical isolation between the inside and outside capacitor banks along the physical length of the multiplier circuitry. Alternately, the space 50 between the capacitor banks can be sealed and can be filled with a dielectric gas such as $SF_6$ as long as suitable provision is made for mechanically securing the inside capacitor bank within the outside capacitor bank.

Rather than using the common prepackaged semiconductor diodes, as illustrated, as the rectifiers, other configurations of rectifiers could be used. For example, unpackaged semiconductor diode dies could be positioned directly on one of the individual capacitor electrodes to which it is to be connected and wired or otherwise electrically connected to the other individual capacitor electrode to which it is to be connected.

As apparent from the circuitry shown in FIG. 3, the parallel multiplier circuit includes a plurality of capacitors C4-C6 connected in parallel to ground and electrically connected to rectifiers D1-D6 being driven in parallel through parallel capacitors C1-C3 from the voltage source, i.e., output 31 of the step up transformer. Further, as seen from FIG. 4, the parallel circuit configuration provides a plurality of stages having respective capacitors arranged linearly along the length of the two concentric common capacitor electrodes, shown as tubes 40 and 60. The voltage increases stage by stage which means with the illustrated physical construction, the step up voltage increases linearly with each stage and therefore with respect to the physical spatial dimensions of the physical circuit. It is also advantageous to position the individual capacitor electrodes of the AC capacitor bank spatially out of phase along the length dimension of the device with the individual capacitor electrodes of the DC capacitor bank. This means that the individual AC capacitor electrodes 44 are not positioned spatially, i.e., physically, directly opposite the individual DC capacitor electrodes 64. This positioning of the individual AC capacitor electrodes so that they are not directly opposite the individual DC capacitor electrodes will reduce ripple injection into the high voltage output of the multiplier circuitry.

The parallel circuitry of FIGS. 3-6 can be used to provide the high voltage DC needed to operate the neutron generating tubes in oil well logging equipment, or to operate other loads. The parallel circuitry of FIGS. 3-6 is suited to provide continuous output current to the neutron generating tube or to other loads.

Figure 6:
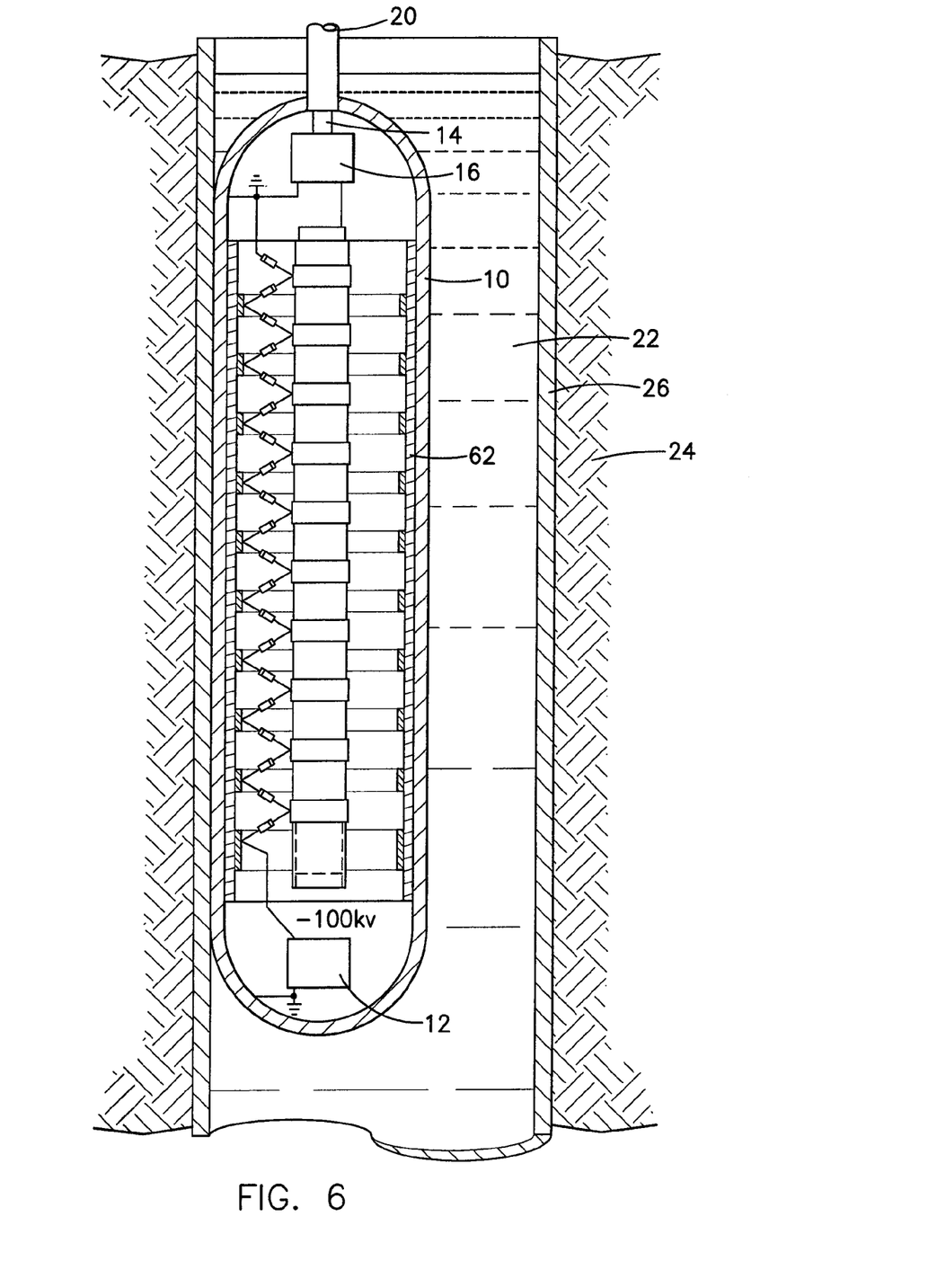
FIG. 6 is a vertical section through an oil well logging device similar to that of FIG. 2 showing a general diagrammatic view of such a logging device with a possible incorporation of the physical arrangement of the circuitry of FIG. 4.

There are times when it is desirous to operate neutron generating tubes in the pulse mode. Here, larger currents are sent through the tube at low duty cycles in an effort to increase neutron yields without thermally damaging the tube itself. In order to supply the necessary current during the pulse without significant droop, the last capacitor in the DC capacitor bank toward the output end, which forms the output capacitor of the voltage multiplier circuit, may be increased in value by increasing the surface area of its individual capacitor electrode. This can be done by extending the individual capacitor electrode along its dielectric material. This is shown in FIGS. 4 and 6 which illustrate the outside bank of capacitors as the DC capacitors, by the increased width of the last individual DC capacitor electrode 68 toward the output end 69 of the voltage multiplier circuit. This last individual output electrode 68 may be up to ten times wider that the other individual electrodes 64 in the outside bank of capacitors. This charge storage mechanism in the last DC capacitor, the output capacitor, helps maintain the DC output as the neutron generating tube is operating. A small value capacitance such as 50 pF will only let the output drop about 20 volts per microsecond during a typical pulse condition.

The AC power supply used with the voltage multiplier circuit may provide an AC signal of various waveforms with various voltages. For Example, the AC power supply 14 may provide a 100 Vpp sinusoidal AC signal to the input (primary winding 15) of the step up transformer 16. With a ten stage multiplier circuit of the invention, the step up transformer may provide a ten kilovolt AC output to the input of the voltage multiplier circuit 18. The voltage multiplier circuit then increases the voltage to a 100,000 volt DC output that is connected to the neutron generator 12. With a twenty stage multiplier circuit of the invention, the step up transformer may provide a five kilovolt AC output to the input of the voltage multiplier circuit 18. The twenty stage voltage multiplier circuit then, again, increases the voltage to a 100,000 volt DC output that is connected to the neutron generator 12. Depending upon the output voltage needed, the available voltage supply, and the components used in the circuitry, various voltage supply signals can be used as input to the step up transformer and the step up transformer can provide various AC signals to the multiplier circuitry. Further, depending upon the AC voltage supply signal available, a step up transformer may not be necessary. If appropriate, the AC voltage supply may alone be the AC voltage source and be connected directly to the voltage multiplier circuit.

Figure 5:
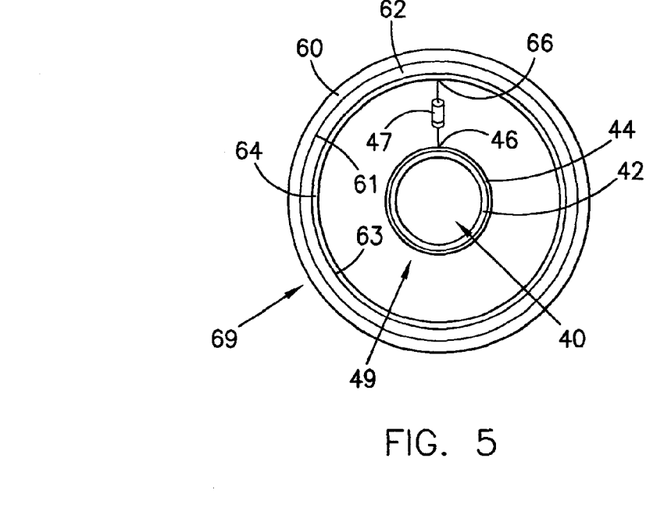
FIG. 5 is a vertical section through a capacitor of the invention taken on the line 5-5 of FIG. 4.

While the multiplier circuitry described and illustrated herein is a direct substitute for the multiplier circuitry 18 of the prior art oil well logging equipment shown in FIGS. 1 and 2 and can be placed directly into the housing 10 or packaged separately and placed into housing 10 of the oil well logging equipment, the concentric construction of the multiplier circuit lends itself to being constructed as an integral part of housing 10. With the arrangement of the banks of parallel capacitors for the particular example embodiment of multiplier circuitry as described and shown, the outside capacitor common electrode 60, FIGS. 4 and 5, is connected to ground and thus maintains a zero potential with respect to ground.

With this arrangement, the outside common capacitor electrode 60 can actually also serve the purpose of and form a part of the metal housing for the logging device as shown in FIG. 6. In such instance, as shown, the device metal housing 10 includes a dielectric material 70 lining a portion of the housing with the individual capacitor electrodes 72 formed on the dielectric lining 70. The inside set of capacitors 74 is positioned inside the housing 10 in the area of the dielectric lining material. The rectifiers are connected between the individual capacitor electrodes of the sets of capacitors. In this embodiment, the housing 10 not only provides the housing for the device, but also serves as the outer common capacitor electrode of the outside set of capacitors.

While the invention has been illustrated and described with respect to embodiments of the invention specifically designed for use in oil well logging applications, it should be realized that the invention can be used in any application where any high voltage DC is required. Further, with the arrangement of the rectifiers in the circuits as shown in the drawings, the high voltage DC output is a negative voltage which is needed for the neutron generating tubes. If used in a different application where a positive high voltage DC is needed, the polarity of the respective rectifiers is reversed.

With parallel circuits for the voltage multiplier of the invention, the capacitors are the components of the circuit across which the higher voltages appear. The reverse voltage across the rectifiers is reduced over the reverse voltages that appear in a series circuit because many more stages may be used without having the problem of the N (number of stages) cubed droop problem or N squared ripple problems. This lower reverse voltage allows the higher temperature operation of the circuits. With such parallel and parallel-series circuits as described in copending application Ser. No. 12/397,015, the voltage across a plurality of the capacitors in the circuit is greater than the voltage across any one of the rectifiers in the circuit. Further, the entire output voltage will generally appear across one of the capacitors. In addition, with the physical construction of sets or banks of parallel capacitors along a common capacitor electrode where the common electrode is elongate, and with the individual capacitors arranged along the length of the common electrode, the stepped up voltages will appear on consecutive capacitors so that the stepped up voltages will increase linearly with respect to the physical spatial dimensions of the circuits.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A high voltage power supply comprising:
    an AC power source to provide an AC output of desired voltage;
    a voltage multiplier circuit comprising:
    an outside set of capacitors connected electrically in parallel having an outside conductive hollow tube with an inside diameter and forming an outside common capacitor electrode, a plurality of individual outside capacitor electrodes positioned within the hollow tube forming the outside common capacitor electrode, and outside dielectric material positioned between each individual outside capacitor electrode of the plurality of individual outside capacitor electrodes and the inside of the outside common electrode;
    an inside set of capacitors connected electrically in parallel having an inside conductive tube with an outside diameter less than the inside diameter of the conductive hollow tube and forming an inside common capacitor electrode, a plurality of individual inside capacitor electrodes positioned outside the conductive tube, and inside dielectric material positioned between each individual inside capacitor electrode of the plurality of individual inside capacitor electrodes and the outside of the inside common electrode, wherein the inside set of capacitors fits concentrically within the outside set of capacitors with space therebetween;
    a plurality of rectifiers positioned within the space therebetween, each rectifier connected between a selected outside individual capacitor electrode of the outside set of capacitors and a selected individual inside capacitor electrode of the inside set of capacitors to form a voltage multiplier circuit; and
    said voltage multiplier circuit being coupled to the AC output of the AC power source so as to provide a DC output voltage higher than the AC output voltage of the AC power source.

2. A high voltage power supply according to claim 1, wherein the outside common capacitor electrode is a conductive hollow tube with an inside surface, the outside dielectric material is positioned around the inside surface of the conductive hollow tube and has an outside dielectric material inside surface, and the plurality of individual outside capacitor electrodes are positioned around the outside dielectric material inside surface.

3. A high voltage power supply according to claim 2, wherein the outside dielectric material is sheet material wrapped around the inside surface of the conductive hollow tube.

4. A high voltage power supply according to claim 3, wherein the sheet material is a Kapton sheet material.

5. A high voltage power supply according to claim 2, wherein the plurality of individual outside capacitor electrodes includes conductive material concentrically positioned around the outside dielectric material inside surface.

6. A high voltage power supply according to claim 5, wherein the outside dielectric material is selected from the group consisting of a ceramic material and a solid polymer.

7. A high voltage power supply according to claim 6, wherein the outside dielectric material is in the form of an outside dielectric material sleeve sized to fit within the outside common capacitor electrode.

8. A high voltage power supply according to claim 7, wherein the outside dielectric material sleeve is a rigid sleeve having an outside dielectric material sleeve outside surface and an outside dielectric material sleeve inside surface, and the outside common capacitor electrode is positioned around the outside dielectric material sleeve outside surface.

9. A high voltage power supply according to claim 8, wherein the inside common capacitor electrode is a conductive tube with an outside surface, the inside dielectric material is positioned around the outside surface of the inside conductive tube and has an inside dielectric material outside surface, and the plurality of individual inside capacitor electrodes are positioned around the outside surface of the inside dielectric material.

10. A high voltage power supply according to claim 9, wherein the inside dielectric material is in the form of a rigid inside dielectric material sleeve having an inside dielectric material sleeve outside surface and an inside dielectric material sleeve inside surface, and the inside common capacitor electrode is positioned around the inside dielectric material sleeve inside surface.

11. A high voltage power supply according to claim 5, wherein the inside common capacitor electrode is a conductive tube with an outside surface, the inside dielectric material is positioned around the outside surface of the inside conductive tube and has an inside dielectric material outside surface, and the plurality of individual inside capacitor electrodes are positioned around the outside surface of the inside dielectric material.

12. A high voltage power supply according to claim 11, wherein one of the capacitors of the voltage multiplier circuit is an output capacitor which provides the DC output voltage, and wherein the output capacitor has a higher capacitance than other capacitors of the voltage multiplier circuit to provide voltage stabilization during pulsed loads.

13. A high voltage power supply according to claim 12, wherein the individual capacitor electrode of the output capacitor has a larger surface area than other individual capacitor electrodes of the voltage multiplier circuit to provide the higher capacitance than other capacitors of the voltage multiplier circuit.

14. A high voltage power supply according to claim 11, wherein the positioning of the inside individual capacitor electrodes is spatially out of phase with the outside individual capacitor electrodes to reduce ripple injection into the DC output voltage.

15. A high voltage power supply according to claim 1, wherein one of the capacitors is an output capacitor which provides the DC output voltage, and wherein the output capacitor has a higher capacitance than other capacitors of the voltage multiplier circuit to provide voltage stabilization during pulsed loads.

16. A high voltage power supply according to claim 15, wherein the individual capacitor electrode of the output capacitor has a larger surface area than other individual capacitor electrodes of the voltage multiplier circuit to provide the higher capacitance than other capacitors of the voltage multiplier circuit.

17. A high voltage power supply according to claim 1, wherein the positioning of the inner individual capacitor electrodes is spatially out of phase with the outer individual capacitor electrodes to reduce ripple injection into the DC output voltage.

18. A high voltage power supply according to claim 1, wherein the inside common capacitor electrode is a conductive tube with an outside surface, the inside dielectric material is positioned around the outside surface of the inside conductive tube and has an inside dielectric material outside surface, and the plurality of individual inside capacitor electrodes are positioned around the outside surface of the inside dielectric material.

19. A high voltage power supply according to claim 18, wherein the inside dielectric material is in the form of a rigid inside dielectric material sleeve having an inside dielectric material sleeve outside surface and an inside dielectric material sleeve inside surface, and the inside common capacitor electrode is positioned around the inside dielectric material sleeve inside surface.

20. A parallel voltage multiplier circuit comprising:
an input adapted to receive an input AC voltage;
an output adapted to output a DC output voltage;
an outside set of capacitors connected electrically in parallel having an outside conductive hollow tube with an inside diameter and forming an outside common capacitor electrode, a plurality of individual outside capacitor electrodes positioned within the hollow tube forming the outside common capacitor electrode, and outside dielectric material positioned between each individual outside capacitor electrode of the plurality of individual outside capacitor electrodes and the inside of the outside common electrode;
an inside set of capacitors connected electrically in parallel having an inside conductive tube with an outside diameter less than the inside diameter of the outside conductive hollow tube and forming an inside common capacitor electrode, a plurality of individual inside capacitor electrodes positioned outside the conductive tube, and inside dielectric material positioned between each individual inside capacitor electrode of the plurality of individual inside capacitor electrodes and the outside of the inside common electrode, wherein the inside set of capacitors fits concentrically within the outside set of capacitors with space therebetween; and
a plurality of rectifiers positioned within the space therebetween, each rectifier connected between a selected outside individual capacitor electrode of the outside set of capacitors and a selected individual inside capacitor electrode of the inside set of capacitors in a configuration to form a voltage multiplier circuit adapted to provide a DC output voltage higher than the voltage of an AC input voltage received on the input.

* * * * *